(12) United States Patent
Zhuang et al.

(10) Patent No.: US 11,579,354 B2
(45) Date of Patent: Feb. 14, 2023

(54) BACKLIGHT MODULE INCLUDING CLAMP, DISPLAY PANEL AND DISPLAY DEVICE INCLUDING THE SAME

(71) Applicants: Hefei Xinsheng Optoelectronics Technology Co., Ltd., Anhui (CN); BOE Technology Group Co., Ltd., Beijing (CN)

(72) Inventors: Qingyi Zhuang, Beijing (CN); Haifeng Xu, Beijing (CN); Ran Tao, Beijing (CN); Jinfeng Zhang, Beijing (CN); Jing Li, Beijing (CN)

(73) Assignees: HEFEI XINSHENG OPTOELECTRONICS TECHNOLOGY CO., LTD., Anhui (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/516,434

(22) Filed: Nov. 1, 2021

(65) Prior Publication Data
US 2022/0155516 A1    May 19, 2022

(30) Foreign Application Priority Data
Nov. 17, 2020   (CN) .......................... 202011284795.5

(51) Int. Cl.
*F21V 8/00*     (2006.01)
*G02F 1/1333*   (2006.01)

(52) U.S. Cl.
CPC .......... *G02B 6/0088* (2013.01); *G02B 6/0053* (2013.01); *G02B 6/0055* (2013.01); *G02F 1/133314* (2021.01); *G02F 1/133317* (2021.01); *G02F 1/133325* (2021.01); *G02F 2201/46* (2013.01); *G02F 2201/465* (2013.01)

(58) Field of Classification Search
CPC ............. G02B 6/0088; G02F 1/133314; G02F 1/133317; G02F 1/133325; G02F 2201/46; G02F 2201/465
See application file for complete search history.

(56) References Cited

U.S. PATENT DOCUMENTS

| | | | |
|---|---|---|---|
| 2009/0290092 A1* | 11/2009 | Tang | G02F 1/133308 362/613 |
| 2010/0277664 A1* | 11/2010 | Kim | G02B 6/009 349/58 |

(Continued)

*Primary Examiner* — Keith G. Delahoussaye
(74) *Attorney, Agent, or Firm* — IPro, PLLC

(57) ABSTRACT

Disclosed is a backlight module. The backlight module includes a back plate, a light guide plate, and a clamp; the back plate includes a back plate body, and a plurality of side plates disposed along a periphery of the back plate body and connected to the back plate body, and a plane of each side plate is intersected with a plane of the back plate body. The light guide plate is disposed on a side, connected to the side plate, of the back plate body, and a gap is present between the light guide plate and each of the plurality of side plates. The clamp is disposed in the gap between the light guide plate and at least part of the plurality of side plates, and interference-fitted with the gap. The clamp is resilient, and the clamp and the side plate are positioned by a projection-recess fitting structure.

15 Claims, 4 Drawing Sheets

(56) References Cited

U.S. PATENT DOCUMENTS

| | | | |
|---|---|---|---|
| 2014/0112021 A1* | 4/2014 | Wang | G02B 6/0088 |
| | | | 362/633 |
| 2016/0341404 A1* | 11/2016 | Xu | F21V 21/00 |
| 2018/0113352 A1* | 4/2018 | Arita | G02B 6/0055 |
| 2018/0157117 A1* | 6/2018 | Jeong | G02B 6/009 |
| 2021/0165157 A1* | 6/2021 | Li | G02B 6/0088 |
| 2021/0263371 A1* | 8/2021 | Tanaka | G02F 1/133317 |

* cited by examiner

BACKLIGHT MODULE INCLUDING CLAMP, DISPLAY PANEL AND DISPLAY DEVICE INCLUDING THE SAME

CROSS-REFERENCE TO RELATED APPLICATION

This application is based on and claims priority to the Chinese patent application No. 202011284795.5, filed on Nov. 17, 2020 and entitled "BACKLIGHT MODULE, DISPLAY PANEL AND DISPLAY DEVICE," the disclosure of which is herein incorporated by reference in its entirety.

TECHNICAL FIELD

The present disclosure relates to the field of display technologies, and in particular relates to a backlight module, a display panel, and a display device.

BACKGROUND

With increasing demands for vehicle-mounted display devices and continuous improvements of specification in the market, high productivity and high reliability of products are desired.

In the related art, a backlight module includes a back plate, a light guide plate, and a clamp. The clamp may be configured to be embedded into a gap between the back plate and the light guide plate. In order to improve the reliability of the clamp, a double-sided adhesive is arranged between the clamp and the back plate, such that one surface of the double-sided adhesive is bonded to the clamp, and the other surface of the double-sided adhesive is bonded to the back plate.

SUMMARY

Embodiments of the present disclosure provide a backlight module, a display panel, and a display device.

According to one aspect of the embodiments of the present disclosure, a backlight module is provided. The backlight module includes:

a back plate, including a back plate body, and a plurality of side plates disposed along a periphery of the back plate body and connected to the back plate body, wherein a plane of each of the plurality of side plates is intersected with a plane of the back plate body;

a light guide plate, disposed on a side, connected to the side plate, of the back plate body, wherein a gap is present between the light guide plate and each of the plurality of side plates; and a clamp, disposed in the gap between the light guide plate and at least part of the plurality of side plates, and interference-fitted with the gap; wherein the clamp is resilient, and the clamp and the side plate are positioned by a projection-recess fitting structure.

In some embodiments, the projection-recess fitting structure includes:

a projection, disposed on a surface, proximal to the side plate, of the clamp; and a recess, disposed on a surface, proximal to the clamp, of at least part of the side plates, wherein the projection is configured to engage with the recess.

In some embodiments, the clamp includes:
a first clamp strip, provided with the projection;
a second clamp strip, provided with the projection;

wherein one end of the second clamp strip is connected to one end of the first clamp strip, and an extension direction of the second clamp strip is intersected with an extension direction of the first clamp strip.

In some embodiments, the first clamp strip is disposed in a gap between the light guide plate and a first side plate of the plurality of side plates, the second clamp strip is disposed in a gap between the light guide plate and a second side plate of the plurality of side plates:

wherein the first side plate is adjacent to the second side plate.

In some embodiments, an included angle defined between the extension direction of the second clamp strip and the extension direction of the first clamp strip is equal to a corresponding corner angle of the light guide plate.

In some embodiments, the backlight module includes two of the clamps.

In some embodiments, the clamp includes:
a first clamp strip, provided with the projection;
two second clamp strips, each of the two second clamp strips being provided with the projection, wherein one ends of the two second clamp strips are respectively connected to both ends of the first clamp strip, and an extension direction of each of the two second clamp strips is intersected with an extension direction of the first clamp strip.

In some embodiments, the plurality of side plates at least includes one first side plate and two second side plates, the two second side plates being respectively disposed on both sides of the one first side plate, both adjacent to the one first side plate; and the first clamp strip is disposed in the gap between the light guide plate and the first side plate, a first of the two second clamp strips is disposed in the gap between the light guide plate and one of the two second side plates, and a second of the two second clamp strips is disposed in the gap between the light guide plate and the other of the two second side plates.

In some embodiments, the first clamp strip is provided with two of the projections.

In some embodiments, an included angle defined between an extension direction of each of the two second clamp strips and an extension direction of the first clamp strip is equal to a corresponding corner angle of the light guide plate.

In some embodiments, the backlight module includes one of the clamps.

In some embodiments, the recess is a through hole extending through two opposite side surfaces of the side plate.

In some embodiments, a quantity of the through holes is four.

In some embodiments, a shape of the projection is consistent with a shape of the through hole, and the projection is clearance-fitted with the through hole.

In some embodiments, a length of the projection is less than or equal to a depth of the through hole.

In some embodiments, the backlight module further includes a light bar disposed in a gap between the light guide plate and a target side plate of the plurality of side plates; and the clamp being not disposed in the gap between the light guide plate and the target side plate.

In some embodiments, a side surface, proximal to the clamp, of the light guide plate is provided with a notch, a side surface, proximal to the light guide plate, of the clamp is provided with a projection strip, and the notch is engaged with the projection strip.

In some embodiments, the backlight module further includes:

an optical film set, disposed on a side, distal from the back plate body, of the light guide plate; and a reflector sheet, disposed between the back plate body and the light guide plate.

According to another aspect of the embodiments of the present disclosure, a display panel is provided. The display panel includes a backlight module, an array substrate disposed on a light emission side of the backlight module, and a color filter substrate disposed on a side, distal from the backlight module, of the array substrate; the backlight module including:

a back plate, including a back plate body, and a plurality of side plates disposed along a periphery of the back plate body and connected to the back plate body, wherein a plane of each of the plurality of side plates is intersected with a plane of the back plate body;

a light guide plate, disposed on a side, connected to the side plate, of the back plate body, wherein a gap is present between the light guide plate and each of the plurality of side plates; and a clamp, disposed in the gap between the light guide plate and at least part of the plurality of side plates, and interference-fitted with the gap; wherein the clamp is resilient, and the clamp and the side plate are positioned by a projection-recess fitting structure.

According to yet another aspect of the embodiments of the present disclosure, a display device is provided. The display device includes a power supply and a display panel connected to the power supply. The power supply is configured to supply power to the display panel. The display panel includes:

a backlight module, disposed on a light emission side of the backlight module, and a color filter substrate disposed on a side, distal from the backlight module, of the array substrate; the backlight module including:

a back plate, including a back plate body, and a plurality of side plates disposed along a periphery of the back plate body and connected to the back plate body, wherein a plane of each of the plurality of side plates is intersected with a plane of the back plate body;

a light guide plate, disposed on a side, connected to the side plate, of the back plate body, wherein a gap is present between the light guide plate and each of the plurality of side plates; and a clamp, disposed in the gap between the light guide plate and at least part of the plurality of side plates, and interference-fitted with the gap; wherein the clamp is resilient, and the clamp and the side plate are positioned by a projection-recess fitting structure.

BRIEF DESCRIPTION OF THE DRAWINGS

The above and other features and advantages of the present disclosure become more obvious by the following detailed description of exemplary embodiments with reference to the accompanying drawings.

REFERENCE NUMERALS AND DENOTATIONS THEREOF

Figure 1:
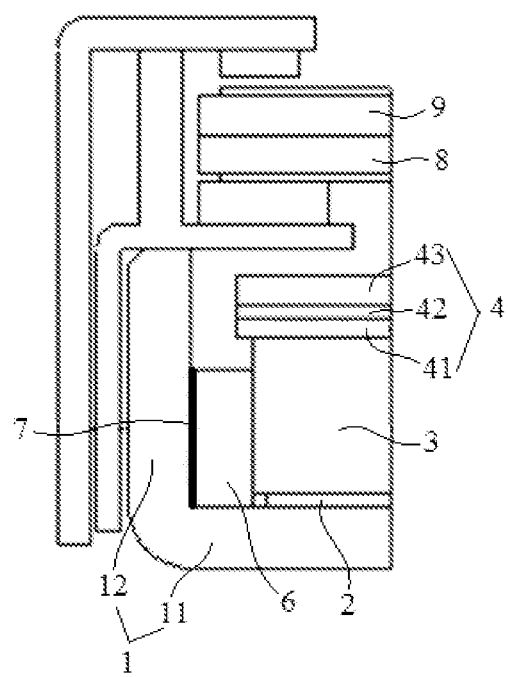
FIG. 1 is a schematic partial section structural diagram of a display panel in related art.

10—backlight module;
1—back plate;
11—back plate body;
12—first side plate;
13—second side plate;
14—through hole;
2—reflector sheet;
3—light guide plate;
31—notch;
4—optical film set;
41—diffusor film;
42—prism sheet;
43—light enhancement sheet;
5—light bar;
6—clamp;
61—first clamp strip;
62—second clamp strip;
63—projection;
64—projection strip;
7—double-sided adhesive;
8—array substrate;
9—color filter substrate; and
01—display panel;
02—power supply.

DETAILED DESCRIPTION

The exemplary embodiments will now be described more fully with reference to the accompanying drawings. However, the exemplary embodiments can be implemented in various ways and should not be construed as a limitation to the embodiments set forth herein; on the contrary, these embodiments are provided to make the present disclosure comprehensive and complete, and fully convey the concept of the exemplary embodiments to those skilled in the art. The same reference numerals in the accompanying drawings indicate the same or similar structures, and thus their detailed descriptions will be omitted.

Referring to FIG. 1, a clamp 6 of a backlight module is fixed on a back plate 1 by a double-sided adhesive 7. For products with a higher reliability requirement, the double-sided adhesive 7 becomes weak under vibration, high temperature, high humidity or the like, and it is prone to trip, casing reworking, such that work efficiency is seriously decreased. Moreover, the backlight module in FIG. 1 is subject to assembling deviation and assembling difficulty, which affects the assembling efficiency.

The information disclosed in FIG. 1 is merely used to facilitate understanding of the background of the present disclosure, and thus the information may include some information not known to those of ordinary skill in the art.

Figure 2:
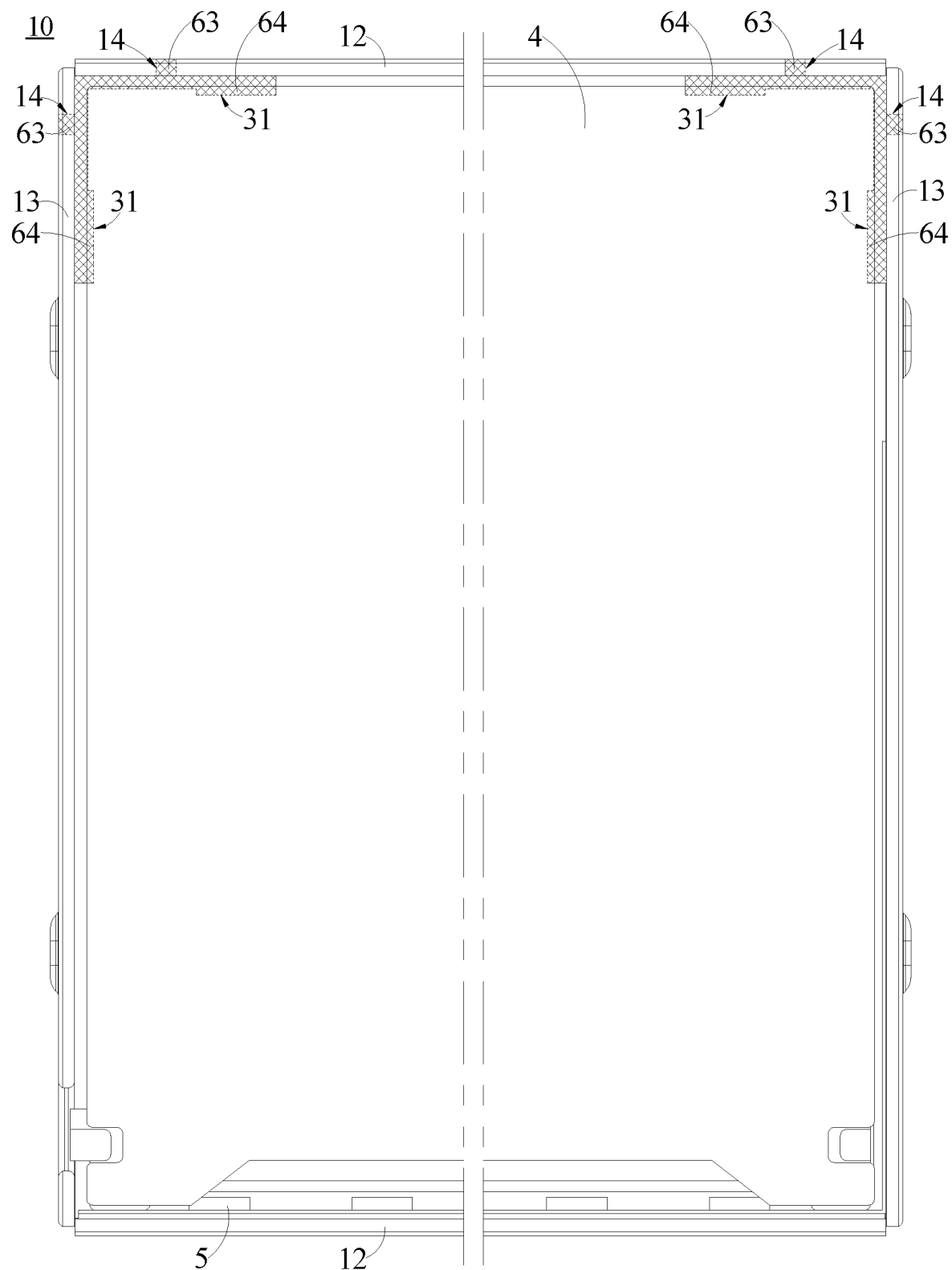
FIG. 2 is a schematic structural diagram of a backlight module according to an embodiment of the present disclosure.
Figure 3:
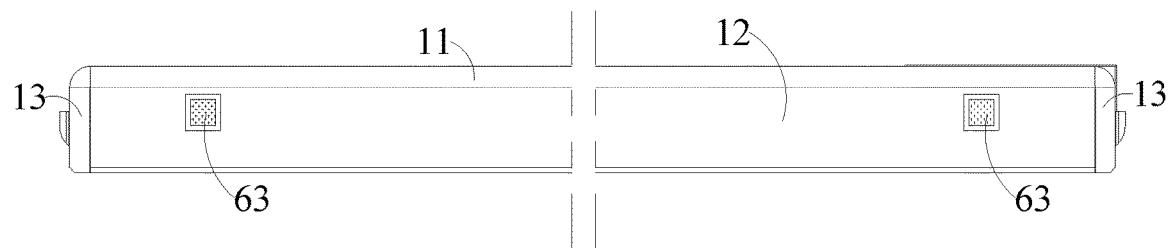
FIG. 3 is a top view of the backlight module shown in FIG. 2.

FIG. 2 is a schematic structural diagram of a backlight module according to an embodiment of the present disclosure. FIG. 3 is a top view of the backlight module shown in FIG. 2. Referring to FIG. 2 and FIG. 3, the backlight module may include a back plate 1, a light guide plate 3, and a clamp 6.

Referring to FIG. 2 and FIG. 3, the back plate 1 includes a back plate body 11, and a plurality of side plates disposed along a periphery of the back plate body 11 and connected to the back plate body 11. A plane of each of the plurality of side plates is intersected with a plane of the back plate body 11. For example, FIG. 2 shows four side plates, wherein the four side plates include two first side plates 12 and two second side plates 13. Moreover, the light guide plate 3 is disposed on a side, connected to the side plate, of the back plate body 11, and a gap is present between the light guide plate 3 and each of the four side plates. In addition, the clamp 6 is disposed in the gap between the light guide plate 3 and at least part of the four side plates, and is interference-fitted with the gap. That is, the clamp 6 is interference-fitted in the gap between the light guide plate 3 and the at least part of the four side plates. The clamp 6 is resilient, and the clamp 6 and the side plate may be positioned by a projection-recess fitting structure. In FIG. 2, in order to better show the improvements of the backlight module, a length direction of the backlight module is drawn with a reduction method.

In some embodiments, the plurality of side plates are connected to the back plate body 11 and the plane of each of the plurality of side plates is intersected with a plane of the back plate body 11, which may indicate that the back plate body 11 is in bend-connection to the plurality of side plates. The bend-connection means that an included angle is formed by connection of the side plate and the back plate body 11, and the included angle is approximately 90 degrees.

According to the backlight module in the embodiments of the present disclosure, in a high temperature reliability test, the light guide plate 3 expands, and the interference between the light guide plate 3 and the clamp 6 increases, and trip may not occur. In a low temperature reliability test, the light guide plate 3 shrinks, the engagement amount of projection-recess fitting structure is sufficient, and trip may not occur. In a vibration reliability test, since the clamp 6 and the side plate are positioned by the projection-recess fitting structure, trip may not occur. Moreover, since the projection-recess fitting structure is manufactured in advance, assembling deviation may be avoided after engagement. In addition, the clamp 6 is resilient, which facilitates that the clamp 6 is interference-fitted in the gap between the light guide plate 3 and the side plate, thereby addressing assembling difficulty. Therefore, occurrence of the deviation between the clamp 6 and the light guide plate 3 may be avoided in assembling process, and reworking may be avoided, thereby improving assembling efficiency and product yield. Moreover, the double-faced adhesive may be omitted compared with the related art, and the space occupied by the double-faced adhesive may be saved, which facilitates a narrow frame design.

In summary, a backlight module is provided in the embodiments of the present disclosure, and the side plate of the back plate of the backlight module and the clamp are positioned by the projection-recess fitting structure. Thus, trip may be avoided in the reliability test. Moreover, assembling deviation and assembling difficulty may be addressed, and the assembling efficiency and the product yield may be increased by using the projection-recess fitting structure to position the side plate and the clamp.

In some embodiments of the present disclosure, the projection-recess fitting structure may include a projection and a recess. The projection may be disposed on a surface, proximal to the side plate, of the clamp 6. The recess may be disposed on a surface, proximal to the clamp 6, of at least part of the side plates. In another exemplary embodiments of the present disclosure, the projection may be disposed on a surface, proximal to the clamp 6, of at least part of the side plates, and the recess may be disposed on a surface, proximal to the side plate, of the clamp. The projection is configured to engage with the recess, that is, the projection is embedded into the recess. Both the methods can achieve the purpose of fixing the clamp 6 to the side plate.

In some embodiments, the back plate 1 may include a back plate body 11 and a plurality of side plates disposed along the periphery of the back plate body 11. The back plate body 11 may be a rectangular plate. Since the rectangular back plate body 11 includes four sides, each of the four sides being provided with a side plate, the back plate 1 may include four side plates. For example, the plurality of side plates include two first side plates 12 disposed on a long side of the back plate body 11, and two second side plates 13 disposed on a broad side of the back plate body 11.

The two first side plates 12 and the two second side plates 13 are in bend-connection to the back plate body 11. In another exemplary embodiments of the present disclosure, the back plate body 11 may be arranged in various shapes as desired, such as a circular, a trapezoidal, a square, a polygonal, or the like. Moreover, the quantity and the shape of the side plates may be match with that of the back plate body 11. For example, in the case that the back plate body 11 is in a circular shape, the side plate may be arranged as an arcuate plate, and a quantity of the arcuate plates may be designed as desired. In the case that the back plate body 11 is in a polygonal shape, the quantity of the side plates may be equal to a quantity of sides of the polygon, and an included angle defined between two adjacent side plates may be greater than or equal to 85 degrees and less than or equal to 95 degrees.

Figure 4:
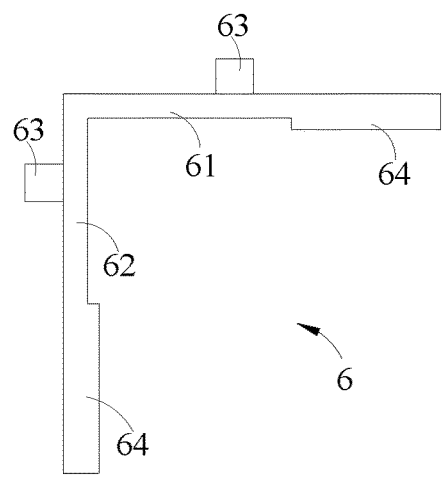
FIG. 4 is a schematic structural diagram of the clamp shown in FIG. 2.

As a first alternative implementation, referring to FIG. 4, the clamp 6 may include a first clamp strip 61 and a second clamp strip 62. Both the first clamp strip 61 and the second clamp strip 62 may be a cuboid strip. The first clamp strip 61 is provided with the projection 63, and the second clamp strip 62 is also provided with the projection 63.

Here, one end of the second clamp strip 62 is connected to one end of the first clamp strip 61, and an extension direction of the second clamp strip 62 is intersected with an extension direction of the first clamp strip 61. For example, an included angle defined between the extension direction of the second clamp strip 62 and the extension direction of the first clamp strip 61 is approximately 90 degrees, such that the first clamp strip 61 and the second clamp strip 62 are connected to form a "L" shape. The included angle defined between the extension direction of the second clamp strip 62 and the extension direction of the first clamp strip 61 may also be angles of other degrees, which is not limited in the embodiments of the present disclosure.

In addition, a length of the first clamp strip 61 may be equal to or different from a length of the second clamp strip 62, which is not limited in the embodiments of the present disclosure.

In some embodiments, the first clamp strip 61 may be disposed in the gap between the light guide plate 3 and the first side plate 12 of the plurality of side plates, and the second clamp strip 62 may be disposed in the gap between the light guide plate 3 and the second side plate 13 of the plurality of side plates. The first side plate 12 is adjacent to the second side plate 13.

For example, the backlight module may include two clamps 6, the two clamps being interference-fitted with the gap. The first clamp strip 61 of one of the two clamps 6 is disposed in the gap between the light guide plate 3 and the upper first side plate 12, and the second clamp strip 62 of the one of the two clamps 6 is disposed in the gap between the light guide plate 3 and the second side plate 13 on the left. The first clamp strip 61 of the other of the two clamps 6 is disposed in the gap between the light guide plate 3 and the upper first side plate 12, and the second clamp strip 62 of the other of the two clamps 6 is disposed in the gap between the light guide plate 3 and the second side plate 13 on the right. That is, the two clamps 6 are respectively disposed at a corresponding corner portion of the two corner portions of the light guide plate 3, that is, each of the two corner portions of the light guide plate 3 is provided with one of the clamps 6.

Since the clamp 6 is disposed at the corner portion of the light guide plate 3, the included angle defined between the extension direction of the second clamp strip 62 and the extension direction of the first clamp strip 61 may be equal to the corresponding corner angle of the light guide plate 3, such that the clamp 6 engages well with the light guide plate 3. For example, the included angle defined between the extension direction of the first clamp strip 61 of one of the two clamp 6 and the extension direction of the second clamp strip 62 of the one of the two clamps 6 is equal to an upper left corner angle of the light guide plate 3. The included angle defined between the extension direction of the first clamp strip 61 of the other of the two clamp 6 and the extension direction of the second clamp strip 62 of the other of the two clamps 6 is equal to an upper right corner angle of the light guide plate 3.

In some embodiments, the included angle defined between the extension direction of the first clamp strip 61 and the extension direction of the second clamp strip 62 of one of the two clamps 6 may be equal to or different from the included angle defined between the extension direction of the first clamp strip 61 and the extension direction of the second clamp strip 62 of the other of the two clamps 6. The included angle defined between the extension direction of the first clamp strip 61 of each of the two clamps 6 and the extension direction of the second clamp strip 62 of each of the two clamps 6 may be determined according to the corner angle of the light guide plate 3 for engagement.

In some embodiments, the recess may be a through hole 14 extending through two opposite surfaces of the side plate. For example, two through holes 14 are symmetrically disposed on one of the two first side plates 12, the two through holes 14 being respectively disposed at two ends of the one of the two first side plates 12. The two second side plates 13 are both provided with one through hole 14, and the through hole 14 on each of the two second side plates 13 is disposed at an end proximal to one of the two first side plates 12 provided with the through hole 14.

In some embodiments, the projections 63 on the first clamp strips 61 of the two clamps 6 are respectively embedded into the two through holes 14 symmetrically disposed on the first side plate 12. The projections 63 on the second clamp strips 62 of the two clamps 6 are respectively embedded into the two through holes 14 disposed on the two second side plates 13.

In some embodiments, a shape of the projection 63 may be consistent with a shape of the through hole 14, such that the projection 63 can engage with the through hole 14. For example, the projection 63 may be clearance-fitted to the through hole 14, thereby facilitating assembling.

For example, referring to FIG. 2 and FIG. 3, the shape of the through hole 14 may be a rectangle (i.e., the through hole 14 is a rectangular through hole), and the rectangular through hole 14 means that the cross sectional shape of the through hole 14 parallel to the side plate is a rectangle. Accordingly, an shape of orthographic projection of the projection 63 onto the side plate may be a rectangle. The shape of the through hole 14 may also be other shapes, such as the through hole 14 may be an oval through hole 14 or a trapezoidal through hole 14, or the like.

That is, the cross sectional shape of the through hole 14 parallel to the side plate is an oval or a trapezoid, or the like. Accordingly, the shape of the orthographic projection of the projection 63 onto the side plate may be an oval or a trapezoid, or the like, to adapt to the shape of the through hole 14.

In addition, the length of the projection 63 may be less than or equal to the depth of the through hole 14. That is, the length of the projection 63 may be equal to the depth of the through hole 14, or may be slightly less than the depth of the through hole 14, so as to prevent the projection 63 protruding out of the back plate, thereby facilitating the assembling of the other parts.

The recess may not be arranged as the through hole 14, but as a slot. An opening of the slot faces the light guide plate 3, that is, the slot is disposed on a side, proximal to the light guide plate 3, of the side plate.

In some embodiments, the backlight module may further include a light bar 5, and the light bar 5 may be configured to provide a light source to the light guide plate 3. The light bar 5 may be disposed in the gap between the light guide plate 3 and a target side plate of the plurality of side plates, while the clamp 6 is not disposed in the gap between the light guide plate 3 and the target side plate.

For example, the target side plate may be one first side plate 12 proximal to the light bar of the two first side plates 12. That is, the target side plate is the lower first side plate 12 of the two first side plates 12 shown in FIG. 2. Each of the two clamps 6 is corresponding to one of the two corner portions of a side, distal from the light bar 5, of the light guide plate 3. That is, each of the two corner portions of a side, distal from the light bar 5, of the light guide plate 3 is provided with one of the clamps 6, and the first clamp strip of each of the two clamps 6 may be disposed between a side, distal from the light bar, of the light guide plate 3 and the first side plate 12. In addition, two through holes 14 are symmetrically disposed on one first side plate, relatively distal from the light bar 5, of the two first side plates 12, and the two through holes 14 are respectively disposed at two ends of the first side plate 12. Each of the two second side plates 13 is provided with one through hole 14, and the through hole 14 on each of the two second side plates 13 is disposed at an end, distal from the light bar 5, of the second side plate 13.

In some embodiments, since a side, provided with the light bar 5, of the light guide plate 3 can be positioned by the light bar 5, the positioning of the light guide plate 3 in an extension direction perpendicular to the light bar 5 may be realized by the first clamp strip 61 of the two clamps 6, and the positioning of the light guide plate 3 in an extension direction parallel to the light bar 5 may be realized by the second clamp strip 62 of the two clamps 6.

Figure 5:
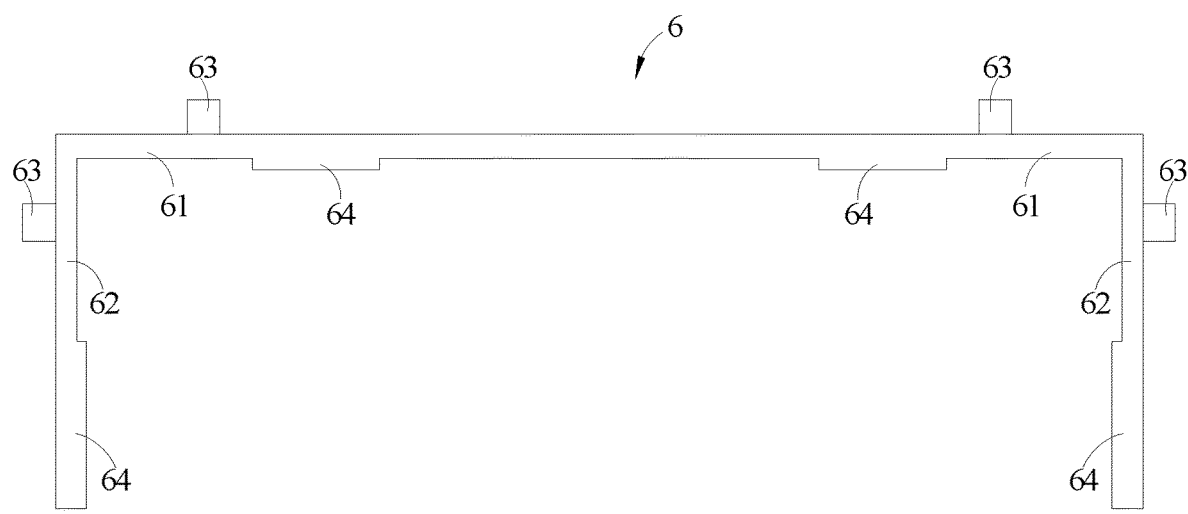
FIG. 5 is a schematic structural diagram of another clamp according to an embodiment of the present disclosure.

In some embodiments, referring to FIG. 5, the clamp 6 may include one first clamp strip 61 and two second clamp strips 62. The one first clamp strip 61 and the two second clamp strips 62 may be a cuboid strip. The first clamp strip 61 is provided with the projection 63, and each of the two second clamp strip 62 is also provided with the projection 63.

One ends of the two second clamp strips 62 are respectively connected to both ends of the first clamp strip 61. That is, one end of one of the two second clamp strips 62 is connected to one end of the first clamp strip 61, and one end of the other of the two second clamp strips 62 is connected to the other end of the first clamp strip 61.

Further, the extension direction of each of the two second clamp strips 62 is intersected with the extension direction of the first clamp strip 61. For example, the included angle defined between the extension direction of each of the two second clamp strips 62 and the extension direction of the first clamp strip 61 is approximately 90 degrees, such that the first clamp strip 61 and the two second clamp strips 62 are connected to form a "⊓" shape. The included angle defined between the extension direction of the two second clamp strip 62 and the extension direction of the first clamp strip 61 may further be angles of other degrees, which is not limited in the embodiments of the present disclosure. In addition, the length of the first clamp strip 61 may be greater than the length of the second clamp strip 62.

In some embodiments, referring to FIG. 2, the plurality of side plates includes at least one first side plate 12 and two second side plates 13. The two second side plates 13 are respectively disposed on both sides of the one first side plate 12, and the two second side plates 13 are both adjacent to the one first side plate 12. The first clamp strip 61 may be disposed in the gap between the light guide plate 3 and the first side plate 12, a first of the two second clamp strips 62 may be disposed in the gap between the light guide plate 3 and one of the two second side plates 13, and a second of the two second clamp strips 62 may be disposed in the gap between the light guide plate 3 and the other of the two second side plates 12.

For example, the backlight module may include one clamp 6, the clamp 6 being interference-fitted with the gap. The first clamp strip 61 of the clamp 6 is disposed in the gap between the light guide plate 3 and the upper first side plate 12, the first of the two second clamp strips 62 is disposed in the gap between the light guide plate 3 and the second side plate 13 on the left, and the second of the two second clamp strip 62 is disposed in the gap between the light guide plate 3 and the second side plate 13 on the right. That is, the clamp 6 may extend from one corner portion of the light guide plate 3 to an opposite corner portion of the light guide plate 3.

In some embodiments, the included angle between the extension direction of the second clamp strip 62 and the extension direction of the first clamp strip 61 may be equal to the corresponding corner angle of the light guide plate 3, such that the clamp 6 engages well with the light guide plate 3. For example, the included angle defined between the extension direction of the first clamp strip 61 of the clamp 6 and the extension direction of the first of the two second clamp strips 62 is equal to the left corner angle of the light guide plate 3. The included angle defined between the extension direction of the first clamp strip 61 of the clamp 6 and the extension direction of the second of the two second clamp strips 62 is equal to the upper right corner angle of the light guide plate 3.

In some embodiments, the included angle defined between the extension direction of the first clamp strip 61 of the clamp 6 and the extension direction of one of the two second clamp strips 62 may be equal to or different from the included angle defined between the extension direction of the first clamp strip 61 and the extension direction of the other of the two second clamp strips 62. The included angle defined between the extension direction of the first clamp strip 61 of the clamp 6 and the extension direction of each of the two second clamp strips 62 may be determined according to the corner angle of the light guide plate 3 to be engaged with.

Since the length of the first clamp strip 61 is relatively long, the first clamp strip 61 may be provided with two projections 63, and each of the two projections is respectively embedded into two through holes 14 symmetrically disposed on the first side plate 12.

It is noted that the introduction of the recess and the light bar 5 in the second implementation may be referred to the detailed description in the first implementation, which is not limited in the embodiments of the present disclosure.

In some embodiments, a side surface, proximal to the clamp 6, of the light guide plate 3 is provided with an elongated notch 31, a side surface, proximal to the light guide plate 3, of the clamp 6 is provided with an elongated projection strip 64. The projection strip 64 may be embedded into the notch 31 to further position the light guide plate 3.

It is noted that the projection-recess fitting structure may further include a first projection, a first through hole, a second projection, and a second through hole. The first projection and the first through hole may be disposed on a surface, proximal to the clamp, of the at least part of the side plates, and the second projection and the second through hole may be disposed on a surface, proximal to the side plate, of the clamp. The first projection is embedded into the second through hole, and the second projection is embedded into the first through hole, thereby the purpose of fixing the clamp and the side plate can be achieved.

Figure 6:
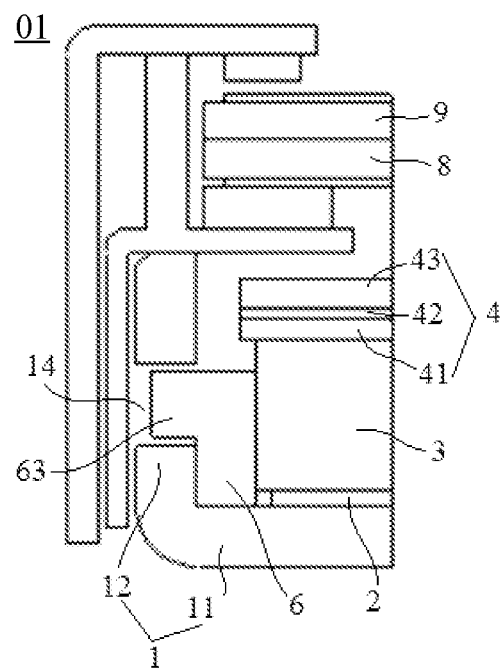
FIG. 6 is a schematic partial section structural diagram of a display panel according to an embodiment of the present disclosure.

FIG. 6 is a schematic partial section structural diagram of a display panel according to an embodiment of the present disclosure. Referring to FIG. 6, the backlight module further includes a reflector sheet 2 and an optical film set 4.

The reflector sheet 2 is disposed on a side, connected to the side plates, of the back plate body 11, and the light guide plate 3 disposed on a side, distal from the back plate body 11, of the reflector sheet 2. That is, the reflector sheet 2 is disposed between the back plate body 11 and the light guide plate 3. The reflector sheet 2 is configured to reflect the light emitted from the light guide plate 3 to the light guide plate 3, and enable the light to emit out of a light emission side of the backlight module. A gap may be present between the reflector sheet 2 and the side plate.

In addition, the optical film set 4 may be disposed on a side, distal from the back plate body 11, of the light guide plate 3. The optical film set 4 may include a diffuser film 41, a prism sheet 42, and a light enhancement sheet 43. The diffuser film 41 is disposed on the side, distal from the back plate body 11, of the light guide plate 3, and a partial area of the diffuser film 41 is adhered to a partial area of the light guide plate 3. The prism sheet 42 is disposed on a side, distal from back plate body 11, of the diffuser film 41, and a partial area of the prism sheet 42 is adhered to a partial area of diffuser film 41. The light enhancement sheet 43 is disposed on a side, distal from back plate body 11, of the prism sheet 42, and a partial area of the light enhancement sheet 43 is adhered to a partial area of the prism sheet 42.

In summary, a backlight module is provided in the embodiments of the present disclosure, and the side plate of the back plate in the backlight module and the clamp are positioned by the projection-recess fitting structure. Thus, a risk of occurrence of trip can be avoided in the reliability test. Moreover, assembling deviation and assembling difficulty may be addressed, and the assembling efficiency and the product yield may be increased by using the projection-recess fitting structure to position the side plate and the clamp.

An embodiment of the present disclosure further provides a display panel. Referring to FIG. 6, the display panel may include a backlight module, an array substrate 8 disposed on a light emission side of the backlight module, and a color filter substrate 9 disposed on a side, distal from the backlight module, of the array substrate 8. The backlight module in the display panel 01 may be the backlight module 10 provided by the above embodiments. The specific structure of the backlight module 10 has been described in detail above, which is thus not repeated herein.

In some embodiments, the display panel may be a liquid crystal display panel.

Figure 7:
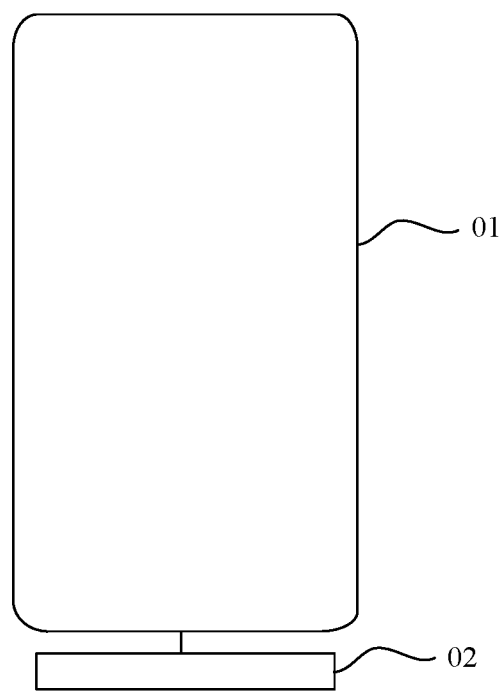
FIG. 7 is a schematic structural diagram of a display device according to an embodiment of the present disclosure.

FIG. 7 is a schematic structural diagram of a display device according to an embodiment of the present disclosure. Referring to FIG. 7, the display device may include a power supply 02 and a display panel connected to the power supply 02. The power supply 02 may be configured to supply power to the display panel. The display panel of the display device may be the display panel 01 provided by the above embodiments. The specific structure of the display panel has been described in detail above, which is thus not repeated herein.

The specific type of the display device is not particularly limited, and commonly used type of the display device in the art may be used, such as a mobile phone and other mobile devices, a watch and other wearable devices, or a VR device, and those skilled in the art may make a corresponding selection according to the specific use of the display device, which is not repeated herein.

It is noted that the display device includes, in addition to the power supply and the display panel, other components that are necessary. A display is taken as an example, and the display specifically includes a housing, a circuit board, a power cord, and the like, which may be supplemented according to the specific use requirements of the display device by those skilled in the art, which is not repeated herein.

Compared with the related art, the benefits of the display panel and the display device according to the exemplary embodiments of the present disclosure are consistent with the benefits of the backlight module according to the above exemplary embodiments, which are not repeated herein.

The above features, structures, or characteristics may be combined in any suitable manner in one or more embodiments. If possible, the characteristics discussed in the embodiments may be interchangeable. In the above description, some specific details are provided to give a full explanation of the embodiments of the present disclosure. However, it should be understood by those skilled in the art that the technical solutions of the present disclosure may be practiced without one or more of the specific details, or that other methods, components, materials, and the like may be employed. In other cases, well-known structures, materials, or operations are not shown or described in detail to avoid obscuring aspects of the present disclosure.

The terms "about," or "approximately" in this description generally means within 20% of a given value or range, preferably within 10%, and more preferably within 5%. The quantity given herein is an approximate quantity, that is, the meaning of "approximately" may be implied without specific description.

Although relative terms, such as "upper," "lower," "left," and "right" are used herein to describe the relative relationship of one component to another component, these terms are used in the description for convenience merely, for example according to the direction of the exemplary directions in the drawings. It is understood that in the case that the device is turned upside down, the "up" component will be the "down" component. Other relative terms, such as "high," "low," "top," "bottom," and the like, also have similar meanings. In the case that a structure is "on" the other structure, it may mean that the structure is integrally formed on the other structure, the structure is "directly" disposed on the another structure, or the structure is "indirectly" disposed on the other structure by another structure.

In the description, the terms "a," "an," "the," and "said" are used to indicate the presence of one or more elements or components; the terms "include," "comprise," and "have" are used to indicate the meaning of an opening inclusion and indicate that there may be other elements/components etc. in addition to the listed elements/components/etc., and the terms "first," "second," and the like are only used as reference, not as a limitation to the quantity of objects thereof.

It should be understood that the present disclosure is not intended to limit the application to the detailed construction and the arrangement of components set forth in this specification. The disclosure can include other embodiments and can be implemented and carried out in various ways, and the above variations and modifications fall within the scope of the present disclosure. It should be understood that the present disclosure as disclosed and defined in this specification extends to all alternative combinations of two or more individual features mentioned or obvious in the context and/or drawings. Multiple alternative aspects of the present disclosure are constituted by all of these different combinations. The embodiments described in this description illustrate the known alternative ways for implementing the present disclosure, and enable those skilled in the art to utilize the present disclosure.

The above description is merely some optional embodiments of the present disclosure, and is not intended to limit the present disclosure, any modification, equivalent replacement, improvement, etc. made within the spirit and principle of the embodiments of the present disclosure should be included in the protection scope of the present disclosure.

What is claimed is:

1. A backlight module, comprising:
    a back plate, comprising a back plate body, and a plurality of side plates disposed along a periphery of the back plate body and connected to the back plate body, wherein a plane of each of the plurality of side plates is intersected with a plane of the back plate body;
    a light guide plate, disposed on a side, connected to the side plate, of the back plate body, wherein a gap is present between the light guide plate and each of the plurality of side plates; and
    a clamp, disposed in the gap between the light guide plate and at least part of the plurality of side plates, and interference-fitted with the gap; wherein the clamp is resilient, and the clamp and the side plate are positioned by a projection-recess fitting structure;
    wherein the clamp comprises:
        a first clamp strip, provided with a projection;
        two second clamp strips, each of the two second clamp strips being provided with the projection, wherein one ends of the two second clamp strips are respectively connected to both ends of the first clamp strip, and an extension direction of each of the two second clamp strips is intersected with an extension direction of the first clamp strip.

2. The backlight module according to claim 1, wherein the projection-recess fitting structure comprises:
   the projection, disposed on a surface, proximal to the side plate, of the clamp; and
   a recess, disposed on a surface, proximal to the clamp, of at least part of the side plates;
   wherein the projection is configured to be fitted to the recess.

3. The backlight module according to claim 1, wherein the plurality of side plates at least comprise one first side plate and two second side plates, the two second side plates being respectively disposed on both sides of the one first side plate, and both of the two second side plates being adjacent to the one first side plate; and
   the first clamp strip is disposed in the gap between the light guide plate and the first side plate, a first of the two second clamp strips is disposed in the gap between the light guide plate and one of the two second side plates, and a second of the two second clamp strips is disposed in the gap between the light guide plate and the other of the two second side plates.

4. The backlight module according to claim 1, wherein the first clamp strip is provided with two of the projections.

5. The backlight module according to claim 1, wherein an included angle defined between an extension direction of each of the two second clamp strips and an extension direction of the first clamp strip is equal to a corresponding corner angle of the light guide plate.

6. The backlight module according to claim 1, wherein the backlight module comprises one of the clamps.

7. The backlight module according to claim 2, wherein the recess is a through hole extending through two opposite side surfaces of the side plate.

8. The backlight module according to claim 7, wherein a quantity of the through holes is four.

9. The backlight module according to claim 7, wherein a shape of the projection is consistent with a shape of the through hole, and the projection is clearance-fitted with the through hole.

10. The backlight module according to claim 7, wherein a length of the projection is less than or equal to a depth of the through hole.

11. The backlight module according to claim 1, further comprising: a light bar disposed in the gap between the light guide plate and a target side plate of the plurality of side plates, wherein the clamp is not disposed in the gap between the light guide plate and the target side plate.

12. The backlight module according to claim 1, wherein a side surface, proximal to the clamp, of the light guide plate is provided with a notch, and a side surface, proximal to the light guide plate, of the clamp is provided with a projection strip, the notch being fitted to the projection strip.

13. The backlight module according to claim 1, wherein the backlight module further comprises:
   an optical film set, disposed on a side, distal from the back plate body, of the light guide plate; and
   a reflector sheet, disposed between the back plate body and the light guide plate.

14. A display panel, comprising: a backlight module, an array substrate disposed on a light emission side of the backlight module, and a color filter substrate disposed on a side, distal from the backlight module, of the array substrate; wherein the backlight module comprises:
   a back plate, comprising a back plate body, and a plurality of side plates disposed along a periphery of the back plate body and connected to the back plate body, wherein a plane of each of the plurality of side plates is intersected with a plane of the back plate body;
   a light guide plate, disposed on a side, connected to the side plate, of the back plate body, and a gap is present between the light guide plate and each of the plurality of side plates; and
   a clamp, disposed in the gap between the light guide plate and at least part of the plurality of side plates, and interference-fitted with the gap; wherein the clamp is resilient, and the clamp and the side plate are positioned by a projection-recess fitting structure;
   wherein the clamp comprises:
   a first clamp strip, provided with a projection;
   two second clamp strips, each of the two second clamp strips being provided with the projection, wherein one ends of the two second clamp strips are respectively connected to both ends of the first clamp strip, and an extension direction of each of the two second clamp strips is intersected with an extension direction of the first clamp strip.

15. A display device, comprising: a power supply, and a display panel connected to the power supply, wherein the power supply is configured to supply power to the display panel, and the display panel comprises:
   a backlight module, an array substrate disposed on a light emission side of the backlight module, and a color filter substrate disposed on a side, distal from the backlight module, of the array substrate;
   the backlight module comprising:
   a back plate, comprising a back plate body, and a plurality of side plates disposed along a periphery of the back plate body and connected to the back plate body, wherein a plane of each of the plurality of side plates is intersected with a plane of the back plate body;
   a light guide plate, disposed on a side, connected to the side plate, of the back plate body, wherein a gap is present between the light guide plate and each of the plurality of side plates; and
   a clamp, disposed in the gap between the light guide plate and at least part of the plurality of side plates, and interference-fitted with the gap; wherein the clamp is resilient, and the clamp and the side plate are positioned by a projection-recess fitting structure;
   wherein the clamp comprises:
   a first clamp strip, provided with a projection;
   two second clamp strips, each of the two second clamp strips being provided with the projection, wherein one ends of the two second clamp strips are respectively connected to both ends of the first clamp strip, and an extension direction of each of the two second clamp strips is intersected with an extension direction of the first clamp strip.

* * * * *

UNITED STATES PATENT AND TRADEMARK OFFICE
CERTIFICATE OF CORRECTION

PATENT NO. : 11,579,354 B2  
APPLICATION NO. : 17/516434  
DATED : February 14, 2023  
INVENTOR(S) : Qingyi Zhuang et al.

Page 1 of 1

It is certified that error appears in the above-identified patent and that said Letters Patent is hereby corrected as shown below:

On the Title Page

Item (73) Should read:  
HEFEI XINSHENG OPTOELECTRONICS TECHNOLOGY CO., LTD. HEFEI, ANHUI, CHINA  
BOE TECHNOLOGY GROUP CO., LTD. Beijing, CHINA Signed and Sealed this  
Fourth Day of April, 2023

Katherine Kelly Vidal  
*Director of the United States Patent and Trademark Office*